2,991,286
HOMODIHYDROCARBOSTYRIL

Ben B. Corson and Louis H. Schwartzman, Pittsburgh, Pa., assignors to Koppers Company, Inc., a corporation of Delaware
No Drawing. Filed Oct. 7, 1959, Ser. No. 844,844
2 Claims. (Cl. 260—289)

This invention relates generally to a method for producing homodihydrocarbostyril and more particularly to a process for producing homodihydrocarbostyril by Beckmann rearrangement.

Many lactams (those organic ring compounds containing in the ring the group —NHCO—) have become important because they have physiological activity and because they are intermediates in the production of polyamide fibers and molded compounds. The lactam, homodihydrocarbostyril, is particularly interesting because possibilities exist for introducing into the phenyl nucleus substituent groups which could influence cross-linking, dyeing, flame-retardance, and other properties.

However, homodihydrocarbostyril has been difficult to prepare heretofore so that despite these possibilities, homodihydrocarbostyril has not achieved large commercial acceptance. Generally, lactams are prepared by subjecting the oximes of cyclic ketones to a Beckmann rearrangement. For example, -caprolactam, which is used to make a synthetic fiber of the nylon type, is prepared by a Beckmann rearrangement of cyclohexanone oxime

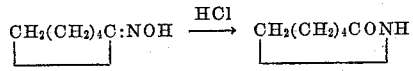

Attempts under similar conditions to prepare homodihydrocarbostyril by the Beckmann rearrangement of the oxime of alpha-tetralone have not been successful; the tetralone in general undergoes aromatization in preference to rearrangement so that alpha-naphthylamine is produced in the case of the oxime of alpha-tetralone. E. C. Horning, V. L. Stromberg, and H. A. Lloyd, JACS, 74, 5153 (1952) have found that while a Beckmann rearrangement of the oxime of the parent compound alpha-tetralone to homodihydrocarbostyril can not be obtained in the conventional manner, the treatment of alpha-tetralone oxime at 130° C. with thirty weight parts of polyphosphoric acid per part of oxime was specific in inducing a Beckmann rearrangement and producing homodihydrocarbostyril in yields of 91%. The use of this great amount of polyphosphoric acid, however, is a deterrent to the commercial production of homodihydrocarbostyril.

An improvement has now been found for the process of producing homodihydrocarbostyril by the Beckmann rearrangement of an oxime of a tetralone in polyphosphoric acid whereby low ratios of polyphosphoric acid to oxime may be used, which improvement comprises adding the oxime to the polyphosphoric acid while maintaining the temperature sufficiently low so that an exothermic reaction does not occur during this addition, maintaining the mixture at this temperature until rearrangement of substantially all the oxime occurs, and recovering the homodihydrocarbostyril from the mixture.

At extreme dilutions of the oxime, as when the polyphosphoric acid to oxime ratio is 30:1, the oxime can be added directly to the acid and the mixture heated. With the low acid to oxime ratio used in the improved process, a highly exothermic reaction takes place unless careful control is maintained of the temperature. In fact, it has been found that the smaller the ratio of the acid to oxime, the lower is the temperature at which this exothermic reaction occurs. Such exothermic reaction destroys the product. Attempts were made to minimize the occurrence of this exothermic reaction and thereby at the same time effect a decrease in the amount of polyphosphoric acid by the use of solvents such as chloroform, xylene, dioxane, carbon tetrachloride, carbon disulphite, N,N-dimethylformamide, ethyl ether, chlorobenzene, dichlorobenzene, Nujol, benzene and acetic acid, but no satisfactory solvent was found. In the case of each solvent, the yield of lactam was low and the isolation of the lactam was difficult. To avoid the exothermic reaction, it has been found advantageous to add the oxime in small portions to the stirred polyphosphoric acid while the acid is maintained at a low temperature, preferably at 80° C. The exothermic reaction can be avoided with this procedure although the weight ratio of polyphosphoric acid to oxime is less than two to one; however, the mixture thickness of these low weight ratios makes stirring difficult.

It is postulated that in the course of the reaction involving the Beckmann rearrangement, a phosphate ester of the oxime is involved. Were no complexes formed between the polyphosphoric acid and the homodihydrocarbostyril, the product homodihydrocarbostyril could be extracted with an inert solvent, and the polyphosphoric acid that remains could be used as the polyphosphoric acid without further treatment for carrying out the process. The use of extraction solvents such as benzene, chloroform, and ether failed to extract the homodihydrocarbostyril, making it necessary therefore to isolate the product by decomposition of the reaction complex with water, and recovery of the homodihydrocarbostyril. The acid which remains would not effect further Beckmann rearrangement. A convenient manner of recovering the homodihydrocarbostyril from the complex is by adding ice to the complex whereupon crude homodihydrocarbostyril precipitates and may be removed by filtration.

It has now been found that the acid, which remains after the homodihydrocarbostyril is recovered, can be regenerated and used again for the production of homodihydroarbostyril from alpha-tetralone oxime. The polyphosphoric acid used in the original rearrangement may be common commercial phosphoric acid having a phosphorus pentoxide content higher than ortho polyphosphoric acid. Such acids have been available for a number of years and have been called polyphosphoric acid, metapolyphosphoric acid, and hexametapolyphosphoric acid. The manufacturers usually make no claim as to their actual composition; although the compositon usually lies between $H_2O.P_2O_5$ and $3H_2O.P_2O_5$. The acid, which remains after the reaction and the separation of homodihydrocarostyril, may be regenerated for use again to effect further Beckmann rearrangement by boiling the acid until the water is evaporated and an azeotropic mixture is obtained. Phosphoric pentoxide is then added to this azeotropic mixture and the mixture heated to form the polyphosphoric acid which may be used as the polyphosphoric acid of the process. Thus, in the practice of this invention, little loss of phosphoric acid occurs.

The oxime of alpha-tetralone may be formed in a conventional manner by the condensation of alpha-tetralone with hydroxylamine. Alpha-tetralone may conveniently be prepared as described in Patent No. 2,595,266 by oxidizing tetralin (tetrahydronaphthalene) with air when the tetralin is at a temperature between 80–120° C. in liquid phase and in the presence of copper carbonate, as a catalyst, to produce tetralin peroxide which is then converted to a mixture of alpha-tetralol and alpha-tetralone by heating the mixture to 180° C. with aqueous sodium hydroxide solution. The mixture so produced is distilled thereafter, the distillate is then refluxed with hydroxylamine hydrochloride in pyridine and methanol to obtain the oxime.

EXAMPLE I

Into a two liter resin flask was poured 852 grams of commercial polyphosphoric acid. The flask was placed in a water bath maintained at 80° C., and the acid vigorously stirred while a total of 303 grams of alpha-tetralone oxime (weight ratio of acid to oxime being 2.8:1) was added in approximately 10 gram portions. Twenty minutes was allowed to elapse between the addition of each portion. The stirring of the mixture in the water bath was continued at 80° C. for an additional two hours after the last portion of the oxime had been added. When all of the oxime was dissolved, the reaction was complete. At the end of this last two hour period, the mixture was cooled to about 30° C. in another water bath, and 1000 grams of ice added to the reaction mass with stirring of the mass (the temperature should not be allowed to rise during this operation as hydrolysis of the homodihydrocarbostyril may occur). A solid precipitated. The crude was filtered and 264 grams of solid recovered. The filtrate was saved for use in Example II.

The solid had a M.P. 130–135° C. and assuming the solid to be homodihydrocarbostyril represented a yield of 87% based on the oxime. This solid was dissolved in ethanol (2 ml. of ethanol/g. of compound), the solution passed over charcoal, and the homodihydrocarbostyril recrystallized from the ethanol to give a refined product melting at 139–140° C.

EXAMPLE II

To concentrate the aqueous acid filtrate from Example I, 620 cc. of the filtrate was placed in a vessel on a steam bath that imparted to liquid a temperature of 90° C. and at the same time was subjected to a vacuum of 20 millimeters by means of an aspirator until a constant volume of liquid was reached. The final volume at this time was 80 cc. and the liquid weight 144.3 grams. The vessel of liquid was cooled by placing it in an ice bath and was maintained there and the liquid stirred while 121 grams of phosphorus pentoxide was added. The liquid was then returned to the steam bath and heated for three hours. A viscous liquid resulted. A portion weighing 113 grams of this viscous liquid was added to a two liter resin flask. The flask was then placed in a water bath that was maintained at 80° C. and while the acid was stirred, a total of 33.2 grams of alpha-tetralone oxime in approximately 4 gram portions was added over a period of four hours. The mixture was maintained in the water bath for another half hour. The mixture was then cooled to about 30° C. and 40 grams of ice was added. A precipitate formed and was recovered by filtration. The precipitate was dissolved in ethyl alcohol; the solution passed over a charcoal; and the product recrystallized from the alcohol. The yield of homodihydrocarbostyril was 98% based on the alpha-tetralone oxime.

EXAMPLE III

The process of Example I was repeated and substantially the same results were obtained. The filtrate from the original rearrangement was again concentrated by heating on a steam bath and under a vacuum as in Example II until a constant volume of liquid was obtained. The concentrated liquid which weighed 144 grams was placed in a two liter resin flask and the flask placed in a water bath maintained at 80° C. While the acid liquor was stirred, a total of 48 grams of alpha-tetralone oxime in about 4 gram portions was added to the acid over a period of five hours. The stirring was continued and the mixture was allowed to remain on the water bath for a half hour after the last portion of oxime had been added. The mixture was cooled to approximately 30° C. and 50 grams of ice added. The solid that precipitated was filtered but analysis revealed the solid to be only alpha-naphthylamine.

In the following two examples, the general procedure of Example I was followed except that a ratio of one part of alpha-tetralone oxime to three parts of polyphosphoric acid was used and the total amounts of alpha-tetralone oxime reacted was changed, thereby changing the time required for the reaction. The grams of alpha-tetralone oxime used, the reaction time, and the yields of homodihydrocarbostyril are tabulated below:

|  | Grams (oxime) | Time (hours) | Yield (percent) |
| --- | --- | --- | --- |
| Example IV | 40 | 5 | 87 |
| Example V | 100 | 6 | 84 |

In the following examples, the general procedure of Example I was followed except that a weight ratio of one part of alpha-tetralone oxime to three parts of polyphosphoric acid was employed and the reaction was carried out at different water bath temperatures and for different reaction times. The results were as follows:

|  | Grams (oxime) | Time (hours) | Temp. (° C.) | Yield (percent) | Remarks |
| --- | --- | --- | --- | --- | --- |
| Example VI | 50 | 1½ | 50–60 | 0 | Incomplete reaction—temperature being too low. |
| Example VII | 100 | .16 | 90 | 77 | An exothermic reaction occurred. |
| Example VIII | 92 | 0.5 | 85 | 86 | An exothermic reaction started but was quickly stopped. |

In the following examples, the general procedure of Example I was followed except that different water bath temperatures were employed and different ratios of polyphosphoric acid to alpha-tetralone oxime were used as well as different reaction times. The results are as follows:

|  | Ratio | Temp. (° C.) | Time (hrs.) | Yield (percent) | Remarks |
| --- | --- | --- | --- | --- | --- |
| Example IX | 12:1 | 125 | .2 | 86 | Product had straw color—120–121.5 melting point. |
| Example X | 6:1 | 125 | .2 | 55 | Reaction mixture turned dark reddish brown, product brownish, 139.5–141.2 melting point. |
| Example XI | 7:1 | 110 | 1 | 87 | Product was light in color, 139.5–140 melting point. |
| Example XII | 6:1 | 80 | 4 | 85 | 139–140.5 melting point. |
| Example XIII | 3:1 | 90 | 2 | 77 | Exothermic reaction took place—product off color, 139–140.8 melting point. |
| Example XIV | 2:1 | 90 | 2 | 0 | Product destroyed by exothermic reaction. |
| Example XV | 1½:1 | 60 | .5 | 0 | Do. |
| Example XVI | 1½:1 | 25 | 62 | 0 | Oxime returned unchanged. |
| Example XVII | 2.5:1 | 70 | 10 | 0 | Do. |

The foregoing has presented a novel process for the Beckmann rearrangement of an oxime of alpha-tetralone to produce the corresponding lactam. The novel process provides a simple and economical way of producing the lactam, particularly in that it is conservative in the use of the reaction medium polyphosphoric acid. While the above illustrations have discussed the oxime of alpha-tetralone, it is to be recognized that the alpha-tetralone parent compound from which the oxime is made may be a tetralone having one or more substituent groups on the phenyl nucleus.

We claim:

1. In a process for the production of homodihydrocarbostyril by a Beckmann rearrangement of an oxime alpha-tetralone in polyphosphoric acid, the improvement which comprises adding said oxime to said acid in small portions to control the heat evolved by the exothermic reaction while maintaining the temperature at about 80° C. and in such quantity that the final ratio of oxime added to the acid is one part by weight of oxime to from two to three parts of acid, maintaining the mixture at about 80° C. until rearrangement substantially occurs, cooling the reaction mixture to about 30° C., adding ice to said mixture to precipitate the homodihydyrocarbostyril, and removing the precipitated homodihydrocarbostyril from the liquid.

2. The process of claim 1 wherein said liquid, after the removal of the homodihydrocarbostyril therefrom, is heated until a composition approaching the composition of ortho phosphoric acid is reached, thereafter adding phosphorus pentoxide to the liquid and heating the liquid to form a liquid usable as said polyphosphoric acid in the initial steps of the process of claim 1 and so reusing the liquid.

References Cited in the file of this patent

Horning et al.: J. American Chemical Society, pages 5153–5155, vol. 74 (1952).